US012798780B2

(12) United States Patent
Da Silva Collares et al.

(10) Patent No.: US 12,798,780 B2
(45) Date of Patent: Nov. 17, 2026

(54) MULTIFUNCTIONAL AIR SYSTEM FOR FUEL CELL POWERED AIRCRAFT

(71) Applicant: EMBRAER S.A., São José dos Campos—SP (BR)

(72) Inventors: Rodolfo Da Silva Collares, São José dos Campos—SP (BR); Dayvis Dias Da Silva, São José dos Campos—SP (BR); Daniel Parrode Fraia De Souza Santos, São José dos Campos—SP (BR)

(73) Assignee: EMBRAER S.A., São José dos Campos— SP (BR)

( * ) Notice: Subject to any disclaimer, the term of this patent is extended or adjusted under 35 U.S.C. 154(b) by 496 days.

(21) Appl. No.: 18/505,667

(22) Filed: Nov. 9, 2023

(65) Prior Publication Data

US 2024/0166356 A1 May 23, 2024

Related U.S. Application Data

(60) Provisional application No. 63/427,274, filed on Nov. 22, 2022.

(51) Int. Cl.

| | |
|---|---|
| ***B64D 13/08*** | (2006.01) |
| ***B60L 50/70*** | (2019.01) |
| *B64D 13/06* | (2006.01) |

(52) U.S. Cl.

CPC .............. *B64D 13/08* (2013.01); *B60L 50/70* (2019.02); *B60L 2200/10* (2013.01); *B64D 2013/0607* (2013.01); *B64D 2013/0618* (2013.01); *B64D 2013/0644* (2013.01); *B64D 2013/0648* (2013.01)

(58) Field of Classification Search

CPC ...... B64D 13/08; B64D 27/355; B64D 15/04; B64D 2013/0607; B64D 2013/0618; B64D 2013/0644; B64D 2013/0648; B60L 50/70; B60L 2200/10

See application file for complete search history.

(56) References Cited

U.S. PATENT DOCUMENTS

| | | | | |
|---|---|---|---|---|
| 2017/0170494 A1* | 6/2017 | Lents | ..................... | B64D 13/06 |
| 2018/0045068 A1* | 2/2018 | Brinson | ................. | B64D 13/06 |
| 2022/0055762 A1* | 2/2022 | Clarke | ................. | B64D 27/355 |
| 2023/0365263 A1* | 11/2023 | Wang | ..................... | B64D 13/08 |

* cited by examiner

*Primary Examiner* — Tavia Sullens

(74) *Attorney, Agent, or Firm* — NIXON & VANDERHYE P.C.

(57) ABSTRACT

Air systems for a fuel cell powered aircraft include at least one compressor for supplying heated compressed air, at least one heat exchange system for receiving the heated compressed air and from the at least one compressor and discharging cooled compressed air, and at least one turbine for receiving the cooled compressed air from the heat exchange system and directing the cooled compressed air to on-board aircraft cabin pressurization and temperature control systems. At least one shaft operatively interconnects the at least one compressor and the at least one turbine. An electric motor is provided and adapted to being powered by electrical power supplied by an on-board fuel cell of the aircraft, the electric motor being operatively connected to the shaft interconnecting the at least one compressor and the at least one turbine so as to operatively cause the shaft to drive the at least one compressor and the at least one turbine.

8 Claims, 4 Drawing Sheets

MULTIFUNCTIONAL AIR SYSTEM FOR FUEL CELL POWERED AIRCRAFT

CROSS-REFERENCE TO RELATED APPLICATION

This application is based on and claims domestic priority benefits from U.S. Provisional Application Ser. No. 63/427,274 filed on Nov. 22, 2022, the entire content of which is expressly incorporated hereinto by reference.

FIELD

The embodiments disclosed herein relate generally to multifunctional air systems that are especially useful in fuel cell powered electrical power trains for the aeronautics and aerospace industries.

BACKGROUND

With the exception of relatively small aircraft, the vast majority of airplanes in service today operate with thermal engines which combust fossil fuels. However, electric solutions to power aircraft combining an electrical motor to either battery energy or fuel cells are extensively being studied generating a number of scientific publications and the creation of demonstrator aircraft.

Aircraft are conventionally equipped with air systems to provide cabin pressurization and temperature control as well as ice protection for the aircraft's aerodynamic surfaces. Since thermal engines that combust fossil fuels typically include a compressor to provide compressed air to feed the combustion chamber (e.g., as is found in conventional turbine aircraft engines), an aircraft normally make use of a small amount of such a compressed air (colloquially known as "bleed air") to feed the aircraft's air systems.

To date, however, it is believed that no consolidated and detailed solutions have been proposed for aircraft air systems in the situation where the aircraft is powered by a fuel cell power train rather than a thermal engine which combusts fossil fuels. It is therefore providing such solutions that the embodiments disclosed herein are directed.

SUMMARY

Broadly, the embodiments disclosed herein are directed toward air systems for fuel cell powered aircraft. According to some embodiments, the air systems will include at least one compressor for supplying heated compressed air, at least one heat exchange system for receiving the heated compressed air and from the at least one compressor and discharging cooled compressed air and at least one turbine for receiving the cooled compressed air from the heat exchange system and directing the cooled compressed air to on-board aircraft cabin pressurization and temperature control systems. At least one shaft operatively interconnects the at least one compressor and the at least one turbine. An electric motor is provided and adapted to being powered by electrical power supplied by an on-board fuel cell of the aircraft, the electric motor being operatively connected to the shaft interconnecting the at least one compressor and the at least one turbine so as to operatively cause the shaft to drive the at least one compressor and the at least one turbine.

According to certain embodiments, the heat exchange system(s) will include respective heat exchangers which exchange heat from the heated compressed air with a hydrogen ($H_2$) flow to the fuel cell, a coolant supplied to the fuel cell and/or external ram air impinging on a wing of the aircraft. A selector/mixing valve may be provided to selectively direct the heated compressed air to one of the heat exchangers in dependence upon the flight conditions of the aircraft. The heat exchanger which exchanges heat from the heated compressed air with external ram air impinging on a wing of the aircraft may include a thermal anti-icing system associated with a leading edge of a wing of the aircraft, the heated compressed air being directed to the anti-icing system so as to heat the leading edge of the wing whereby cooled compressed air is discharged from the anti-icing system.

The air systems according to some embodiments may include first and second compressors and first and second turbines. The first compressor and the first turbine may be interconnected by a first shaft, while the second compressor and the second compressor may be connected together by a second shaft. The at least one heat exchange system may thus include port and starboard side heat exchange systems, whereby the first and second compressors respectively supply heated compressed air to the port and starboard side heat exchange systems, while the port and starboard side heat exchange systems respectively supply cooled compressed air to the first and second turbines. The electric motor may thus be adapted to being operatively coupled to a propeller gearbox associated with a propeller of the aircraft, while the first shaft may be connected to the propeller gearbox. In such embodiments, the first and second shafts are interconnected by a shaft gearbox. According to some embodiments, the electric motor is adapted to being operatively coupled to a propeller gearbox associated with a propeller of the aircraft and the at least one shaft is connected to the propeller gearbox.

The air system according to other embodiments may further include first and second compressors and first and second turbines. The at least one heat exchange system may thereby comprise port and starboard side heat exchange systems, whereby the first compressor is adapted to being operatively connected by a first subshaft to propeller gear box associated with a propeller of the aircraft so as to supply heated compressed air to the port side heat exchanger. The first turbine will therefore receive cooled compressed air from the port side heat exchanger. The first turbine will include a second subshaft and a generator connected to the second subshaft. The second compressor and the second turbine are connected together by a second shaft, whereby the second compressor supplies heated compressed air to the starboard side heat exchanger while the second turbine receives cooled compressed air from the starboard side heat exchanger.

Other embodiments are provided with an air system for a fuel cell powered aircraft which includes at least one compressor for supplying heated compressed air, at least one heat exchange system for receiving the heated compressed air and from the at least one compressor and discharging cooled compressed air and a vapor cycle machine which receives the cooled compressed air from the at least one heat exchanger. The VCM is adapted to supply pressurization and environmental air to an aircraft cabin. As in other embodiments, an electric motor is adapted to being powered by electrical power supplied by an on-board fuel cell of the aircraft, the electric motor being operatively connected to the at least one compressor. At least one turbine and at least one shaft interconnecting the at least one turbine with the at least one compressor and the electric motor may also be provided.

These and other aspects and advantages of the present invention will become clearer after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
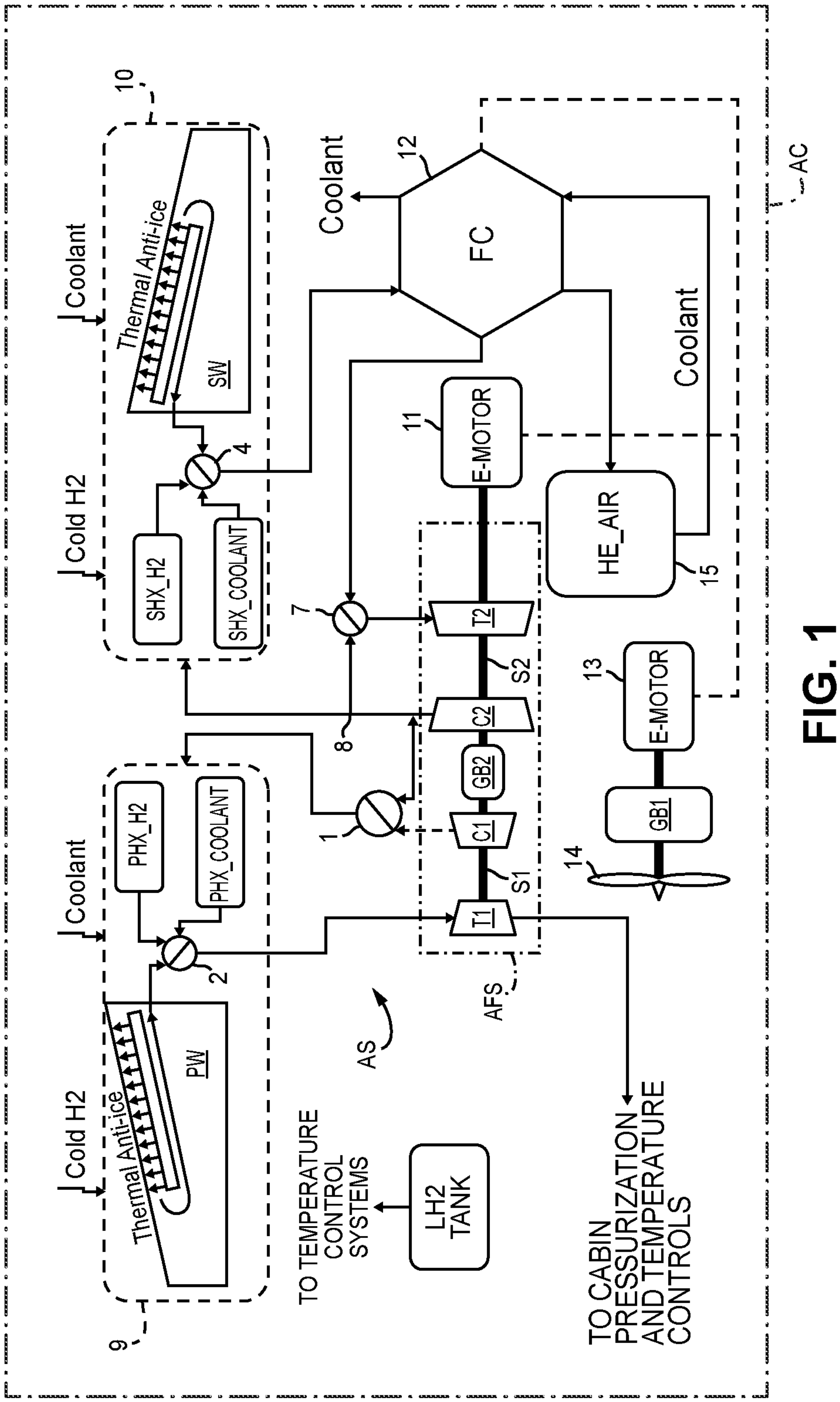
FIG. 1 is a schematic diagram showing a fuel cell and multifunctional air system in accordance with an embodiment of this invention.

A fuel cell powered aircraft AC is schematically depicted in FIG. 1 as being powered by a fuel cell 12 which powers an electric motor 13 driving a propeller 14 via a gearbox GB1. The fuel cell 12 is cooled by a cooling system 15. In accordance with an embodiment of the invention, an air system AS is provided. One suitable fuel cell power train and thermal management system that may be employed is described in U.S. application Ser. No. 18/505,642 filed concurrently herewith which is based on U.S. Provisional Application Ser. No. 63/427,232 filed on Nov. 22, 2023, the entire contents of each application being expressly incorporated hereinto by reference.

The air system AS includes an air flow subsystem AFS which comprises two shafts S1, S2 linked by a gear box GB2, each shaft S1, S2 bearing a compressor C1, C2 and a turbine T1, T2, respectively. The shaft S2 is also operatively coupled with an electric motor 11 that serves as motive power for the shaft S2, and hence the shaft S1 via the gearbox GB2, from electrical power the motor 11 receives from the fuel cell 12. The compressors C1, C2 provide air flow to the fuel cell 12 and the airplane air systems such as the anti-icing system and the cabin pressurization systems. A selector/mixer valve 1 selects which of the compressors C1 or C2 the air flow for cabin control is supplied from. Selection or mixing is defined by a controller (not shown) adjusted to choose the best source for each flight condition.

The compressed air discharged from the selector/mixing valve 1 is directed to a port side heat exchange system 9 which reduces the temperature of the air. The air flow within the portside heat exchange system 9 may exchange heat with the hydrogen ($H_2$) flow to the fuel cell 12, the coolant supplied to the fuel cell 12 and/or external ram air impinging on the portside wing PW. The controller (not shown) operates a selector/mixing valve 2 so as to direct the compressed air from the compressor C1 to the heat exchange mechanism, i.e., the portside H2 heat exchanger PHX_H2 or the portside fuel cell coolant heat exchanger PHX_Coolant in dependence on which is best for the flight conditions encountered by the aircraft AC. The cooled air flow supplied to the turbine T1 expands within the turbine T1 thereby donating energy to the air flow subsystem AFS and decreasing the air temperature and pressure to appropriate levels for cabin pressurization and temperature control.

A portion of the air flow from compressor C1 may be directed by the selector/mixing valve 1 to a starboard side heat exchange system 10 in which the air flow temperature is modulated to the temperature required by the fuel cell exchanging heat with H2 via the starboard side H2 heat exchanger SHX_H2 or the starboard side fuel cell coolant heat exchanger SHX_Coolant. The starboard side heat exchange system 10, like the portside heat exchange system 9, will include a selector/mixing valve 4 chooses which heat exchange mechanism is best for the flight conditions encountered by the aircraft AC.

The compressed air flow from compressor C2 is bifurcated at a T-junction 8, such that part of the compressed air flow is directed to the starboard side heat exchange system 10 so as to ultimately feed the fuel cell 12 which thereafter joins via the selector/mixing valve 7 with the previously diverted air to expand in the turbine T2. The diversion allows the compressor C2 to operate at high pressure even at low fuel cell air flow demand and allows that the air that expands in turbine T2 is preheated which avoids icing formation issues after expansion.

A principal advantage provided by the embodiment of the present invention as shown in FIG. 1 is that the harmonic integration and synergy between air flow and temperature modulation demands required to perform the fuel cell air and $H_2$ systems on the one hand and the airplane air flow systems for cabin temperature control and anti-ice systems on the other hand.

Figure 2:
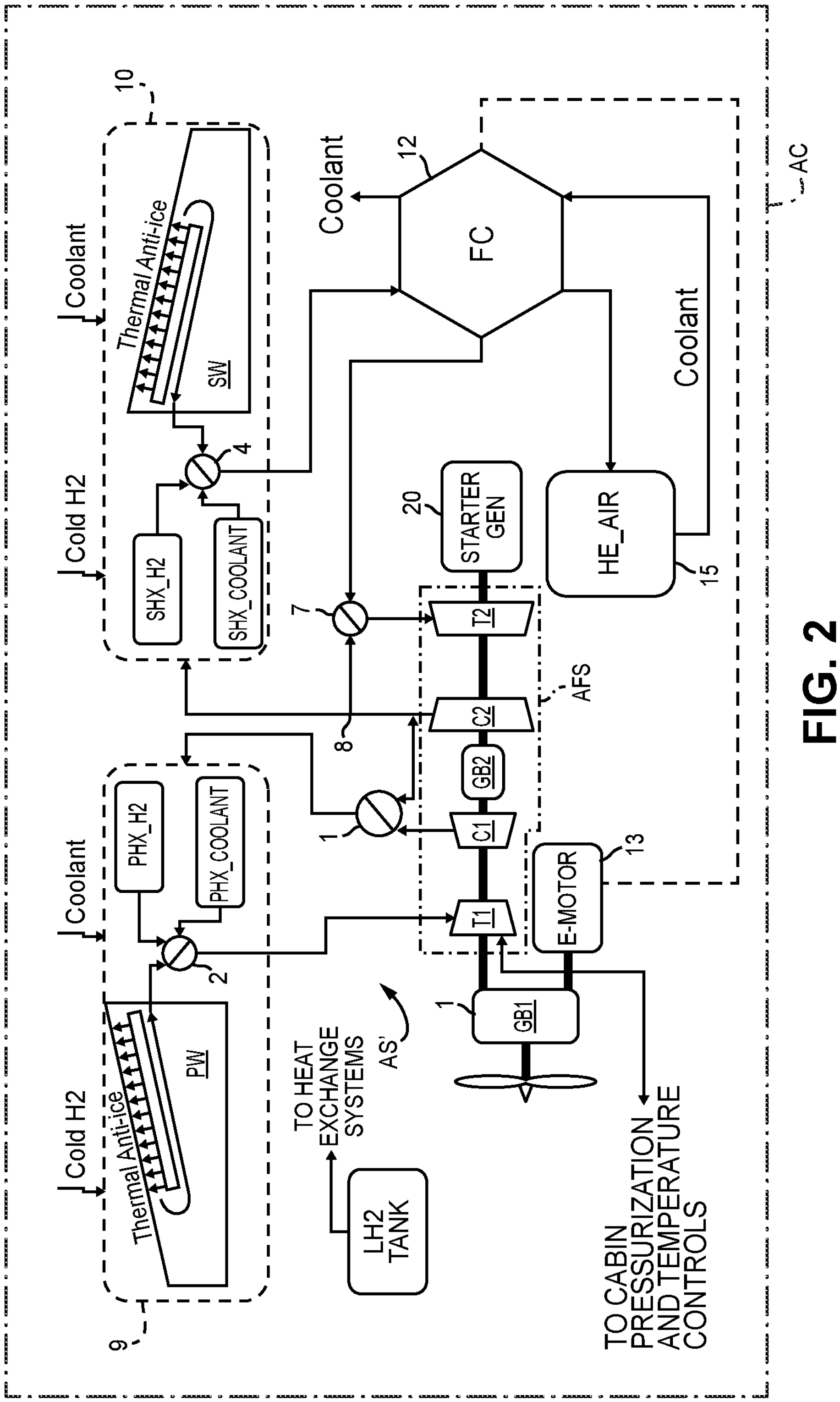
FIG. 2 is a schematic diagram showing another embodiment of the fuel cell and multifunctional air system in accordance with this invention.

FIG. 2 schematically shows a variation of the air system AS shown in FIG. 1 whereby similar components shown therein have retained the same reference in FIG. 2 and will therefore not be described again. As shown in FIG. 2, the air system AS' shown in FIG. 2 is assembled to extract energy from the propeller gear box GB1 and the electric motor 13 from via the shafts S1, S2 and the gear box GB2 so as to drive a starter generator 20.

Figure 3:
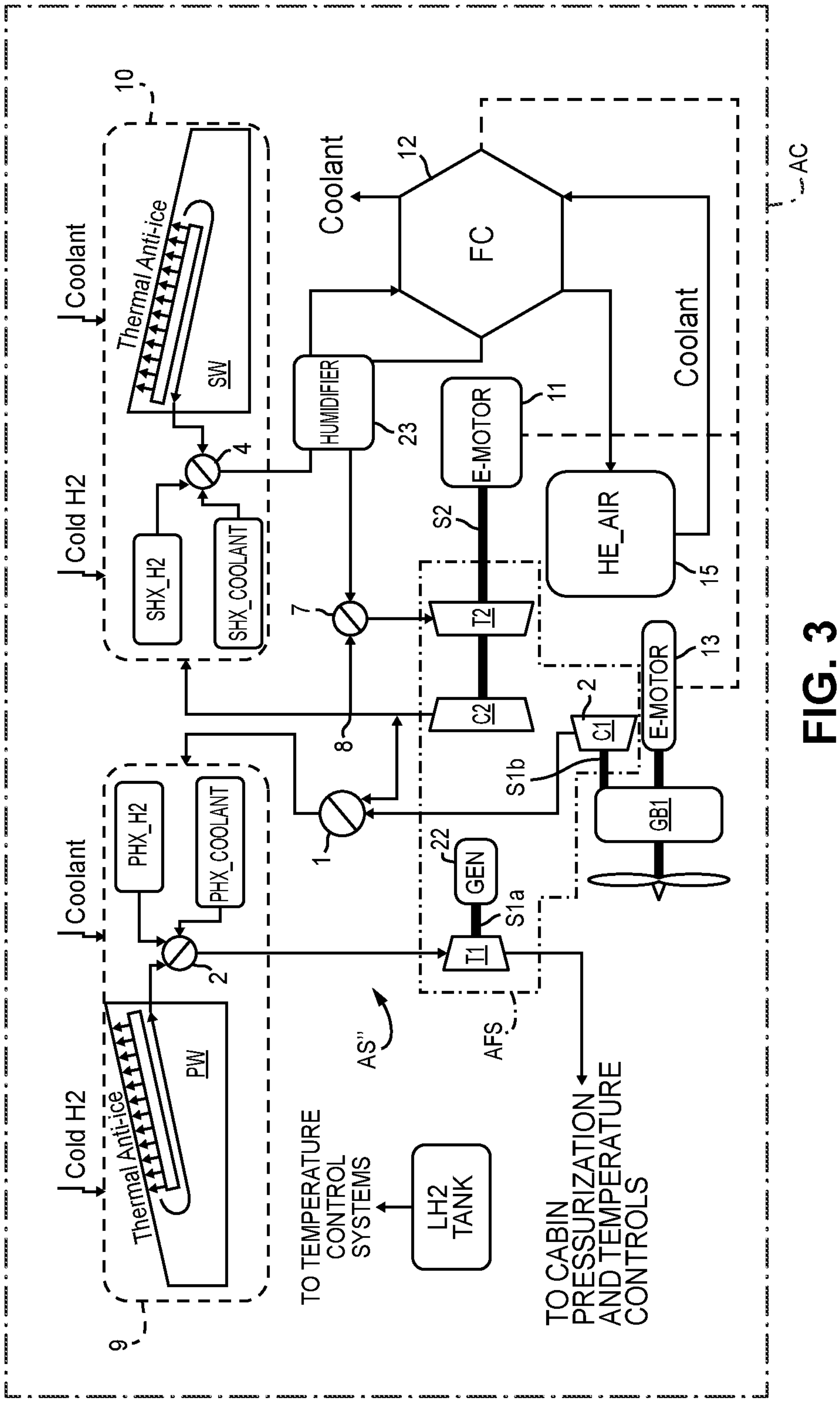
FIG. 3 is a schematic diagram showing yet another embodiment of the fuel cell and multifunctional air system in accordance with this invention.

FIG. 3 schematically shows a further variation of the air system AS shown in FIG. 1 whereby similar components shown therein have retained the same reference in FIG. 3 and will therefore not be described again. As shown in FIG. 3, the air system AS" shown in FIG. 3 includes the turbine T1 being linked to a generator 22 via shaft S1*b* while the compressor C1 is linked directly to the propeller gear box GB1 via the shaft S1*b*. A humidifier 23 may also be interposed between the valve 4 and the fuel cell 12 so as to humidify the air discharged from the valve 4 and the fuel cell 12.

Figure 4:
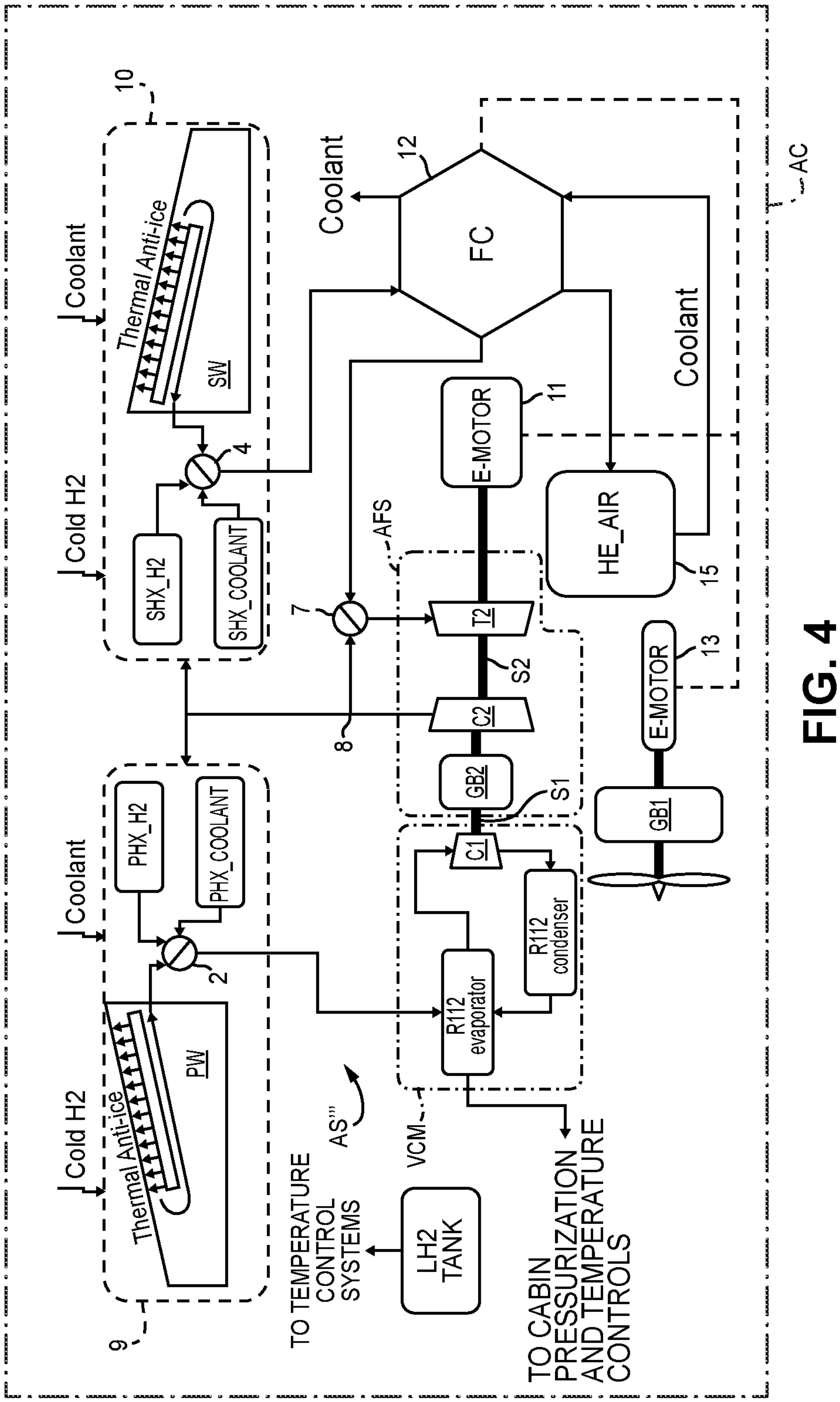
FIG. 4 is a schematic diagram showing a further embodiment of the fuel cell and multifunctional air system in accordance with this invention.

FIG. 4 schematically shows yet another variation of the air system AS shown in FIG. 1 whereby similar components shown therein have retained the same reference in FIG. 4 and will therefore not be described again. As shown in FIG. 4, the air system AS'" shown in FIG. 4 the compressor C1 forms a component part of a vapor cycle machine VCM that is mechanically linked to the fuel cell airflow subsystem AFS via shaft S1. The compressor C2 therefor supplies compressed air to both the port and starboard side heat exchange devices 9, 10, respectively, while the cooled compressed air discharged from the valve 2 is supplied to the evaporator of the vapor cycle machine VCM.

While reference is made to particular embodiments of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An air system for a fuel cell powered aircraft comprising:
- first and second compressors each for supplying heated compressed air;
- port and starboard heat exchangers each of which receives the heated compressed air from the first and second compressors and discharges cooled compressed air, respectively;
- first and second turbines each respectively receiving the cooled compressed air from the port and starboard heat exchangers and adapted to direct the cooled compressed air to an on-board aircraft system;
- a first shaft operatively interconnecting the first compressor and the first turbine;
- a second shaft operatively interconnecting the second compressor and the second turbine, the second shaft comprising a generator attached thereto;
- a shaft gearbox interconnecting the first and second shafts; and
- an electric motor adapted to being powered by electrical power supplied by an on-board fuel cell of the aircraft, the electric motor being operatively connected to a propeller gearbox associated with a propeller of the aircraft, wherein
- the first shaft is connected to the propeller gearbox, and wherein
- the first and second compressors and the first and second turbines are interconnected so as to operatively cause the first and second shafts to drive the first and second compressors and the first and second turbines, respectively.

2. The air system according to claim 1, wherein the port and starboard heat exchangers comprise multiple heat exchangers which exchange heat from the heated compressed air with a hydrogen ($H_2$) flow to the fuel cell, a coolant supplied to the fuel cell and external ram air impinging on a wing of the aircraft, respectively.

3. The air system according to claim 2, which further comprises a selector/mixing valve for selectively directing the heated compressed air to one of the multiple heat exchangers in dependence upon flight conditions of the aircraft.

4. The air system according to claim 3, wherein a respective one of the multiple heat exchangers which exchanges heat from the heated compressed air with external ram air impinging on a wing of the aircraft comprises a thermal anti-icing system associated with a leading edge of the wing of the aircraft, and wherein the heated compressed air is directed to the anti-icing system so as to heat the leading edge of the wing whereby cooled compressed air is discharged from the anti-icing system.

5. The air system according to claim 1, wherein the electric motor is adapted to being operatively coupled to the propeller gearbox associated with the propeller of the aircraft.

6. A fuel cell powered propeller aircraft which comprises the air system according to claim 1.

7. An air system for a fuel cell powered aircraft comprising:
- first and second compressors and first and second turbines,
- at least one shaft operatively interconnecting the first and second compressors and the first and second turbines, respectively;
- port and starboard side heat exchangers each of which respectively receives the heated compressed air from the first and second compressors and discharges cooled compressed air, and
- an electric motor adapted to being powered by electrical power supplied by an on-board fuel cell of the aircraft, wherein
- the first compressor is adapted to being operatively connected by a first subshaft to a propeller gear box associated with a propeller of the aircraft so as to supply heated compressed air to the port side heat exchanger, and wherein
- the first turbine receives cooled compressed air from the port side heat exchanger, and wherein
- the first turbine comprises a second subshaft and a generator connected to the second subshaft, and wherein
- the second compressor and the second turbine are connected together by a second shaft, the second compressor supplying heated compressed air to the starboard side heat exchanger and the second turbine receiving cooled compressed air from the starboard side heat exchanger.

8. A fuel cell powered propeller aircraft which comprises the air system according to claim 7.

* * * * *